The present invention relates to methods and apparatus for cooking food, and it more particularly relates to new and improved methods and apparatus for controlling the cooking cycle in a steam operated pressure type cooker.

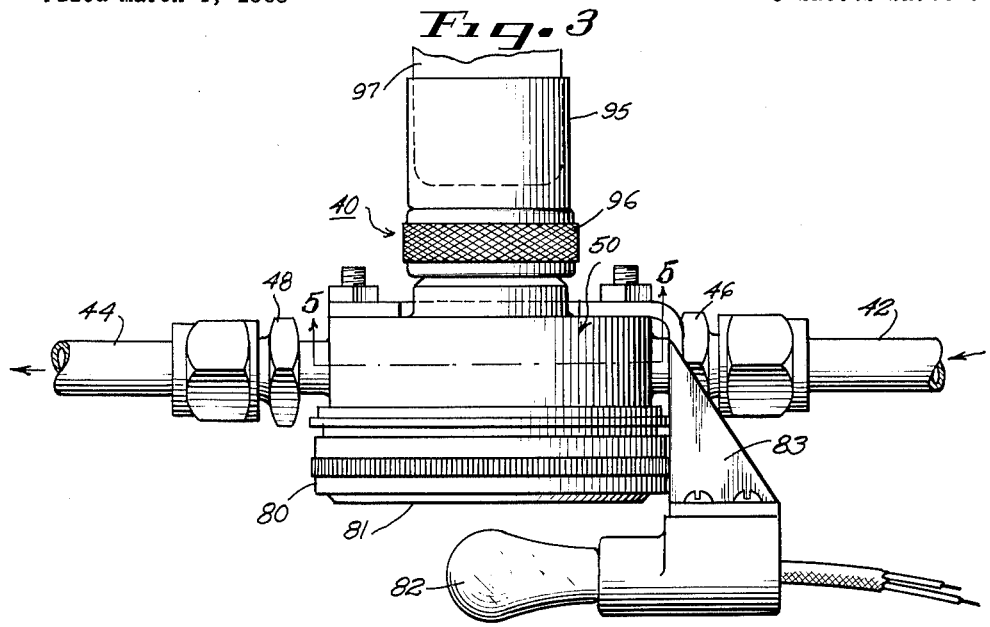
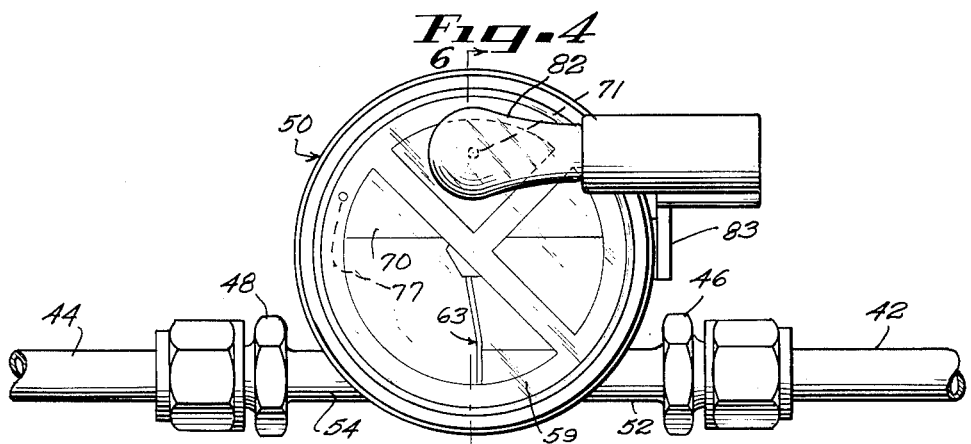
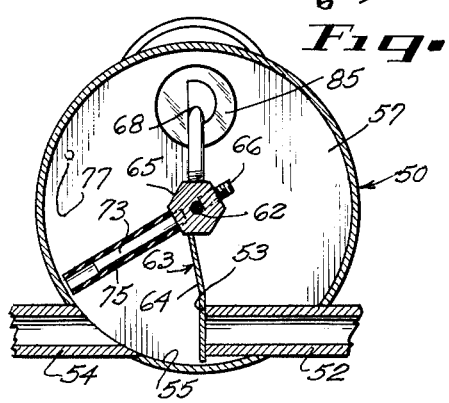
INVENTORS
Robert J. Shulz
BY Alfred Vischer, Jr.
ATTORNEYS April 26, 1966 R. J. SHULZ ET AL 3,248,221
METHODS FOR COOKING FOOD
Filed March 4, 1963 3 Sheets-Sheet 3
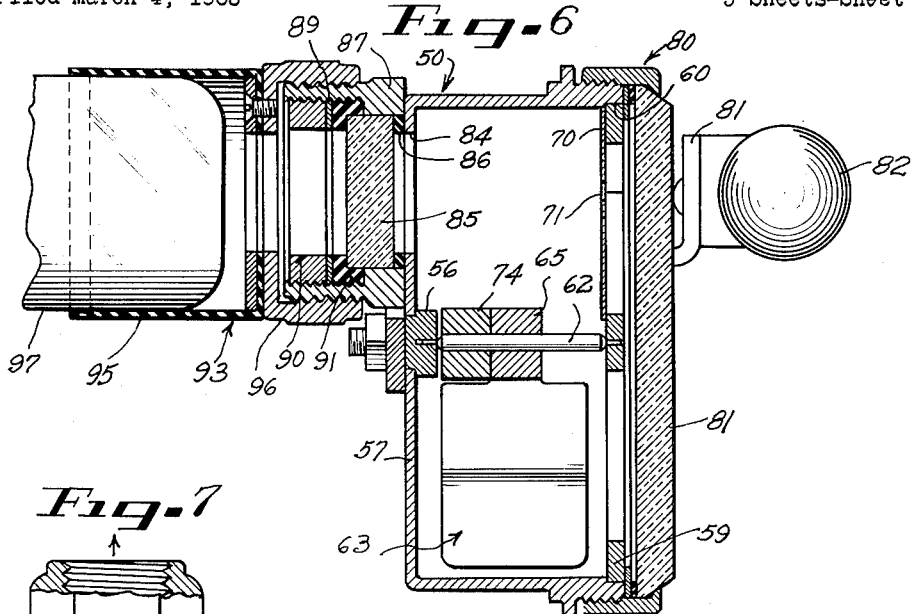
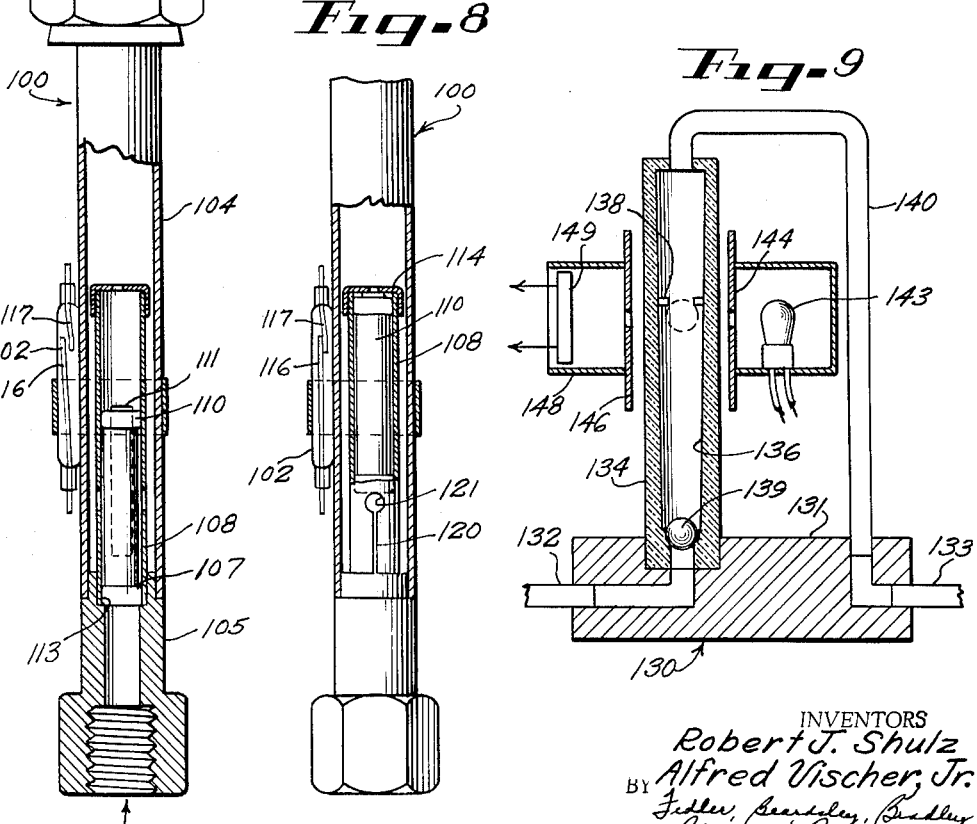
INVENTORS
Robert J. Shulz
Alfred Vischer, Jr.
BY
ATTORNEYS 3,248,221
METHODS FOR COOKING FOOD
Robert J. Shulz, Brookfield, and Alfred Vischer, Jr., Park Ridge, Ill., assignors of two-thirtieths each to William Vischer and Alfred Vischer III, two-thirtieths to Alfred Vischer, Jr., as trustee of Peter Vischer, four-thirtieths each to Walter W. Zitzewitz and Elmer K. Zitzewitz, one-thirtieth each to Gertrude J. Zitzewitz and Barbara O. Zitzewitz, and two-thirtieths to Gertrude V. Bouton
Filed Mar. 4, 1963, Ser. No. 262,595
3 Claims. (Cl. 99—1)

It has become recognized in the past several years that a new type of cooking can be advantageously employed to rapidly prepare large quantities of food. This new type of cooking is in some ways similar to prior art steam cooking and yet is in other ways more like prior art pressure cooking. However, it differs in important respects from both of these types of cooking and has many advantages over both. In this new cooking system dry steam is sprayed in high velocity jets directly onto the food to be cooked while the food is maintained in a hermetically sealed cooking vessel.

A prior art cooking system of this new type is described in application Serial No. 782,303, filed December 22, 1958, now Patent No. 3,071,063. In this system the cooking vessel remains connected to the source of dry steam until the passage of a predetermined period of time, at which point the cooking cycle is concluded by interrupting the supply of steam and venting the cooking vessel to the atmosphere to exhaust the steam therefrom. This technique has been found to be only reasonably satisfactory because the temperature of the food at the beginning of the cooking cycle is unknown since the starting temperature of the food cannot readily be determined. Hence, it would be desirable to control the cooking cycle in response to the temperature of the food being cooked or in response to a factor which is related to this temperature.

If the steam is supplied from a source wherein its temperature and pressure are precisely controlled, the temperature and the pressure within the cooking vessel increase toward the respective values of the source. It has been found that during such a cooking operation steam continuously flows into the vessel at a rate which is related to the diminishing rate at which the food absorbs heat during the cooking process. As the cooking operation proceeds, the flow of steam into the cooker gradually decreases and asymptotically approaches a value wherein the steam flow to the cooker is just sufficient to replace the amount of steam which is condensed because of heat losses in the system. Accordingly, the degree to which the food has been cooked is related to the rate of steam flow into the cooking vessel and it would be desirable to control the cooking cycle in response to the rate of flow of steam into the cooking chamber.

In order to insure that a sufficient quantity of steam is available to the cooker at all times, it is desirable that the passageway connecting the steam source to the cooker have a low flow resistance and since the back pressure which is developed in such a line is directly proportional to the velocity of steam flow, it is desirable to supply the steam to the cooker at a relatively low velocity. This, however, makes the accurate measurement of the rate of steam flow difficult, and the flow responsive control mechanism must be extremely sensitive to operate under such conditions. It has been found that either photoelectric or magnetic control means are preferable for this purpose.

Therefore, a principal object of the present invention is to provide a new and improved method and apparatus for cooking food.

Another object of the present invention is to provide new and improved apparatus for controlling a cooking cycle.

A further object of the present invention is to provide a new and improved fluid flow responsive control means.

Briefly, the above and further objects are realized in accordance with the present invention by providing a cooking system comprising a source of pressurized dry steam, a sealable cooking vessel, and a valve controlled passageway between the source of steam, and the cooking vessel, which valve is controlled in response to the flow of steam between the source of steam and the cooking vessel, so that when the flow of steam falls below a predetermined level the connection between the source and the cooking vessel is closed. Preferably, at this same time the cooking vessel is vented to the atmosphere to exhaust the steam therefrom and to terminate the cooking cycle.

A preferred method of cooking food comprises positioning the food in a sealed vessel, supplying steam to the vessel to bring the pressure and temperature in the vessel to a predetermined cooking level, and maintaining the pressure at the cooking level by continuing to supply steam to the sealed vessel until the flow of steam to the sealed vessel decreases below a predetermined amount, at which time the supply of steam is interrupted and the sealed vessel is exhausted to the atmosphere.

Suitable apparatus applying the above method for cooking food preferably comprises a sealable vessel for receiving the food to be cooked, a source of pressurized, dry steam, conduit means including a valve for connecting the source of pressurized dry steam to the sealable vessel, and means responsive to the flow of steam from the source of pressurized dry steam to the sealable vessel for closing said valve when the flow of steam falls below a predetermined level. The means responsive to the flow of steam of the aforesaid apparatus as described above may also comprise a member movably mounted in the path of the dry steam, and photoelectric means responsive to the location of said member for providing a control signal, and the member movably mounted in the path of the dry steam may be in the form of a pendulum suspended in the path of the dry steam.

In accordance with another feature of this invention, new and improved fluid flow responsive control devices offering a minimum of resistance to the fluid flow being monitored are provided.

Further objects and advantages and a better understanding of the present invention may be had by reference to the following detailed description taken in connection with the accompanying drawings in which:

FIG. 3 is a top plan view of a fluid flow responsive device embodying certain features of the present invention and which is useful in the system of FIG. 1;

FIG. 4 is a side elevational view of the device of FIG. 3;

FIG. 5 is a cross-sectional view taken along the line 5—5 of FIG. 3 with the lamp supporting bracket removed for purposes of clarity;

FIG. 6 is a cross-sectional view taken along the line 6—6 of FIG. 4 assuming the entire device to be shown in FIG. 4;

FIG. 7 is a view, partly in section, of another fluid flow measuring device embodying the teachings of the present invention and useful in the cooking system of FIG. 1;

FIG. 8 is a view, partly in section, of the same device as FIG. 7, but illustrating it in a different state of operation; and FIG. 9 is a sectional view of still another fluid flow measuring device embodying features of the present invention and useful in the cooking system of FIG. 1.

Figure 1:
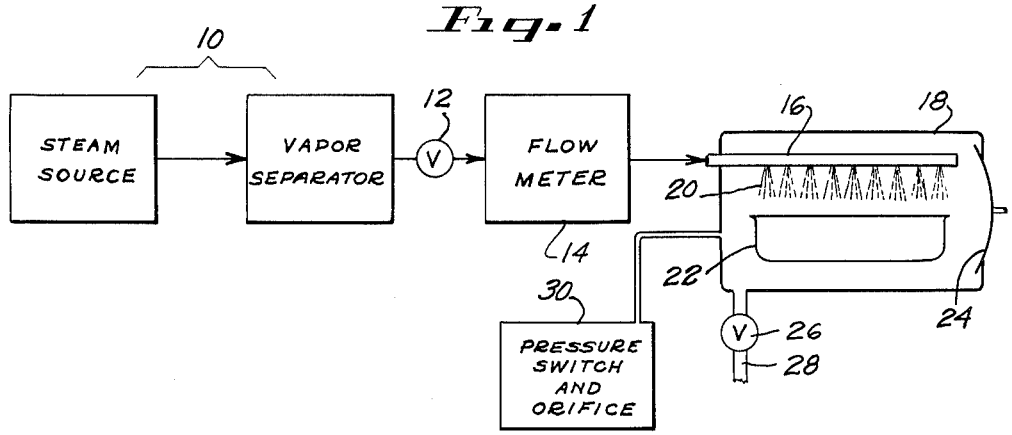
FIG. 1 is a schematic diagram of a cooking system embodying the teachings of the present invention.

Referring now to the drawings and particularly to FIG. 1 thereof, there is shown, in schematic form only, a pressure cooking system embodying the present invention. In this system a source of dry steam 10, which may be of any type such, for example, as an immersion type steam generator and associated vapor separator, is connected through a control valve 12, and a serially connected flow meter 14 to a nozzle 16 which extends along the upper portion of a sealable cooking vessel 18 and directs a plurality of jets of steam 20 directly onto the food to be cooked which is contained in an open-topped pan 22 suitably supported in the cooking chamber near the bottom of the vessel 18. A door 24 sealably closes an access opening at one end of the vessel 18 to permit insertion and removal of the pan 22. The door 24 is preferably of the type described in United States Patent No. 2,828,045. A control valve 26 is connected in a drain line 28 to control the removal of condensate from the vessel 18 and moreover to controllably connect the vessel to the atmosphere to exhaust the steam therefrom at the end of a cooking cycle. A pressure responsive switch 30 is also connected to the cooking chamber and operates in conjunction with a small precisely dimensioned orifice (not shown) to controllably connect the cooking chamber to the atmosphere at the beginning of a cooking cycle until the pressure in the chamber has risen to a small predetermined value such, for example, as 2.5 p.s.i. This feature of the cooking system is fully described in U.S. Patents Nos. 3,071,063 and 3,071,473.

In order to terminate the cooking cycle when the food has been cooked to a desired degree, the flow meter 14 is connected directly in the steam line to the nozzle 16 and operates to close the valve 12 and to open the drain valve 26 when the flow of steam into the cooker falls below a preset value. Inasmuch as the rate of steam flow into the cooker is related to the degree to which the food in the cooker has been cooked, the flow meter 14 provides an accurate means for controlling the cooking of the food.

Figure 2:
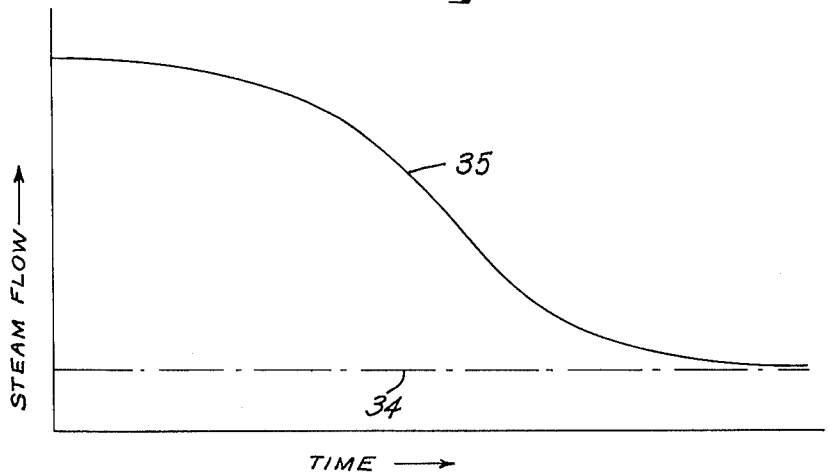
FIG. 2 is a graph relating the flow of steam into a pressure cooker to time during a typical cooking cycle of the present system.

Referring to FIG. 2, there is shown a generalized graphical illustration of the flow of steam into the cooking chamber during a typical cooking cycle. In this curve time is plotted as the abscissa and the rate of steam flow is plotted as the ordinate. At the beginning of a typical cooking cycle the valve 12 is opened to admit steam to the cooker. When the cooking cycle starts the flow rate of steam is at its maximum. As the cooking continues and the ability of the food to absorb heat decreases the flow rate decreases proportionally. When the heat absorption is at a minimum the food can be considered cooked and the further application of heat will overcook it. As shown, during the cooking cycle the flow asymptotically approaches the value indicated by the line 34, which is that value of steam flow required to compensate for the heat losses in the system downstream of the flow meter 14. The particular shape of the steam flow versus time curve 35 is dependent on many factors including the particular food being cooked and the temperature and physical state of the food at the beginning of the cooking cycle. Nevertheless, the curve illustrated in FIG. 2 is typical of that which is obtained when frozen vegetables such, for example, as corn or peas are being cooked and has been chosen solely to illustrate the reason why a cooking cycle can be precisely controlled in response to the flow of steam into the cooker.

In FIGS. 3 and 4 there is shown a photoelectric flow meter 40 connected between an inlet conduit 42 and an outlet conduit 44. The conduits 42 and 44 are respectively connected to inlet and outlet nipples 46 and 48 which are mounted in mutual alignment on a circular cup-shaped housing 50. As best shown in FIGS. 4 and 5, the nipple 46 has a tubular extension 52 which extends through the wall of the housing 50 and terminates within the chamber defined by the housing. The inner end 53 of the tubular extension 52 is planar and disposed perpendicular to the axis of the tube 52. The face 53 is spaced a small distance from the diametric plane of the housing 50 to which it is parallel. The nipple 48 also has a tubular extension 54 which opens into the chamber in the housing 50, but unlike the tube 52, the tube 54 terminates flush with the inner face of the circular side wall 55 of the housing 50. A bushing 56 is secured as by welding in the bottom face 57 of the housing 50 and cooperates with an apertured plate 59 which is fitted in a counterbore or rabbet 60 in the housing 50 rotatably to support a pintle 62. A plate 63 is fixedly secured to the pintle 62, and as best shown in FIG. 5, the plate 63 is bent at a slight angle along a line 64, so that the lower portion thereof fits snugly against the end 53 of the steam inlet tube 52. Steam flowing from the tube 52 thus pushes the plate 63 clockwise as viewed in FIG. 5 to permit the steam to pass into the tubular member 54 and out of the housing 50. The angular position of the pintle 62 is thus representative of the rate of steam flow through the meter 40.

The plate 63 is connected to the pintle 62 by means of an apertured hub member 65 which is fixed to the pintle 62 by means of a set screw 66. A flag 68 has a staff portion threadedly connected to the hub member 65 on the side opposite from which the plate 63 extends. Fixedly secured across the plate 59 across the upper portion thereof is an arcuate plate 70 having an aperture 71 therein at a location adjacent the position of the flag 68 when the plate 63 is in abutment with the end 53 of the steam inlet tube 52. When the plate 63 pivots clockwise under the influence of steam from the tube 52, the flag 68 rotates away from the aperture 71.

In order to balance the pintle 62 so that the flag 68 is over the aperture 71 during the absence of steam flow in the system, a rod 73 is threadedly secured to a hub member 74 which is fastened to the pintle 62 by means of a set screw, not shown. A resilient sleeve 75, formed of a suitable material, such for example as rubber, is positioned over the rod 73 and extends beyond the end thereof. The stop pin 77 which extends parallel to the pintle 62 and which is secured in the plate 59 is located above the tube 54 for engagement with the sleeve 75 to resiliently stop the rotation thereof to prevent the entire rotatable mechanism from rotating to a position whereupon termination of the steam flow it would not return to the closed position illustrated in FIG. 5. Accordingly, the pin 77 is positioned so that when it is engaged by the sleeve 75 the weight member 73 is in about the ten o'clock position to the left of the vertical as shown in FIG. 5.

A cover member 80 having a glass face 81 sealed thereto is threadedly attached over the housing 50. A lamp support bracket 83 is secured to the housing 50 and a light source in the form of an electric lamp bulb 82 is mounted thereon directly opposite to the aperture 71 whereby light from the lamp bulb 82 may flow through the glass face 81 of the cover member to the aperture 71. Directly opposite to the lamp bulb 82 in the housing bottom 57 is a window 84 having a glass face 85 abutting the gasket 86 and hermetically sealed to the housing to prevent the leakage of steam from the flow meter. This sealing arrangement includes a bushing 87 which is sealably secured as by soldering or welding to the housing bottom 57 and which has the gasket 86 against which the glass 85 abuts. The bushing 87 is internally threaded to receive an externally threaded ring 90 which compresses a sealing gasket 91 against the glass 85 and the bushing 87. A flat metal washer 89 prevents damage to the gasket 91 as the ring 90 is tightened. An external thread on the bushing 87 and complementally formed knurled nut 96 provides means for securing a light shield 93 thereon. The shield 93 includes a tubular extension 95 for receiving a phototube or photocell 97 which provides an electrical indication when light impinges thereon.

In operation when steam begins to flow into the cooker the plate 63 is swung clockwise and during high flow rates the sleeve 75 engages the stop pin 77. The flag 68 is thus moved away from the aperture 71 so that light shines from the lamp bulb 82 through the aperture 71 and the window glass 85 onto the photocell contained within the shield 95. By suitable electrical control circuits the light shining on the photocell maintains the inlet steam valve to the cooker open and the exhaust valve from the cooker closed. This condition continues until the flow of steam has fallen to a sufficiently low value that the plate 63 moves to a predetermined position in near engagement with the end 53 of the inlet tube 52. With the plate 63 in this position the flag 68 is located between the lamp bulb 82 and the aperture 71. This cuts off the supply of light to the photocell which responds by causing the electrical control circuit to close the steam inlet valve and to open the exhaust valve thereby completing the cooking operation.

As indicated hereinabove, as the end of a cooking cycle is approached the flow of steam into the cooker is extremely small and, therefore, it is imperative that the flow meter 40 be sensitive to very low flow rates and that it not excessively interfere with the flow of steam into the cooking vessel. Flow meter 40 has these characteristics.

Referring now to FIGS. 7 and 8, there is shown a flow meter 100 which employs a magnetically operated switch 102 for controlling the operation of the steam inlet and exhaust valves in the system in response to the flow of steam into the cooker. The flow meter 100 comprises a tubular housing 104 having suitable fittings at the opposite ends thereof for connecting the unit in a steam line. The flow meter 100 is designed for orientation in an upright position, as shown in FIGS. 7 and 8, and like the flow meter 40 it uses the force of gravity to return the operating members to the home position. The lower fitting 105 has a counterbored upper end 107 in which a tubular member 108 is fitted. A cylindrical slug 110 having enlarged ends and molded of a suitable material such, for example, as Teflon, has a cylindrical magnet 111 held therein and is slidably disposed within the tube 108 for movement between the lowermost position shown in FIG. 7, wherein it rests against the shoulder 113 of the fitting 105 and an uppermost position wherein it engages a cap 114 threadedly attached to the top of the tube 108. As steam flows into the fitting 105 from the bottom of the unit, it forces the slug 110 upwardly an amount dependent upon the rate of steam flow through the unit. When the slug 110 is in its uppermost position the magnet 111 is located directly opposite the contact points on a pair of contacts 116 and 117 in the switch 102 and of which contact 116 is a cantilever mounted magnetic contact member and thereby pulls the cantilever mounted magnetic contact member 116 towards the magnet 111 and thus into electrical contact with the contact member 117, thereby completing an electrical circuit. This condition occurs when there is a high rate of flow through the unit, and with the slug 110 in this position steam is by-passed from the tube 108 through a plurality of longitudinal slots 120 near the bottom of the tube. The slots 120 terminate at their upper ends in enlarged openings 121 located below the bottom edge of the slug 110 as viewed in FIG. 8.

As the flow of steam decreases the slug 110 falls downwardly under the influence of gravity and gradually cuts off the amount of steam which is by-passed ahead of the lower end of the slug 110. At a predetermined position of the slug 110 the magnetic force of attraction on the cantilever mounted magnetic contact member 116 is insufficient to overcome its inherent resiliency to move to the open position and the magnetically operated switch 102 is opened. When this happens, the electric circuit will cause the steam inlet valve to close and the exhaust valve to open. Prior to the opening of the magnetically operated switch 102 the slug 110 has moved downwardly past the enlarged opening 121 so that only a very small amount of steam is being by-passed at that time. Some by-pass is, however, preferable in order to enable the measurement of extremely small values of steam flow.

Referring to FIG. 9 there is shown another photoelectrically operated means for controlling a cooking cycle in accordance with the rate of steam flow into the cooker. In FIG. 9 there is shown a flow meter 130 which comprises a housing 131 having a steam inlet 132 and a steam outlet 133. A tube 134 is mounted in a counterbore in the housing 131 and has an enlarged vertically extending bore 136 therein which tapers outwardly towards the top. A stop member 138 is located within the bore 136 at a location near the top thereof and a light, spherical ball, such for example as a well-known pith ball, is located within the bore 136 for movement under the influence of steam upwardly against the stop 138. A conduit 140 connects the top of the tube 134 with the outlet tube 133 through the housing 131. The tube 134 is formed of a transparent material such, for example, as glass, and a suitable light source 143 is disposed opposite an apertured plate 144 for directing light through the tube 134 at a location immediately beneath the stop 138. On the opposite side of the tube 134 there is provided an apertured plate 146 having a light shielding tubular extension 148 thereon in which a photocell 149 is mounted so as to be responsive to light entering the sleeve 148 through the aperture in the plate 146.

In operation steam flowing into the tube 132 forces the ball 139 against the stop 138, wherein the ball 139, being opaque, interrupts the passage of light from the source 143 to the photocell 149. The stop 138 is suitably apertured to by-pass steam around the ball 139. When the flow of steam drops below that predetermined level corresponding to the degree of cooking desired, the ball 139 falls downwardly out of line with the apertures in the plates 144 and 146 thereby permitting the flow of light from the source 143 to the photocell 149. When this occurs, the associated electric circuit operates to terminate the cooking cycle.

While the present invention has been described in connection with particular embodiments thereof, it will be understood that those skilled in the art may make many changes and modifications without departing from the true spirit and scope of this invention and, therefore, it is intended in the appended claims to cover all such changes and modifications which fall within the true spirit and scope of this invention.

I claim:
1. A method of cooking food in a steam-operated pressure type cooker comprising the steps of:
   positioning a food item in a sealed vessel,
   supplying steam to said vessel to bring the pressure and temperature in said vessel to a predetermined cooking level, maintaining the pressure at the cooking level by continuing to supply steam to said vessel, measuring the flow rate of steam to said sealed vessel until the flow decreases to a predetermined rate indicating a completion of the cooking, and stopping the supply of steam and exhausting said sealed vessel to the atmosphere upon the measurement of said predetermined steam flow rate.

2. A method of cooking food in a steam-operated pressure type cooker as set forth in claim 1, wherein the steam flow measurement is used to automatically interrupt the application of steam to said cooker and to open said cooker to the atmosphere.

3. A method of cooking food in a steam-operated pressure type cooker as set forth in claim 2, wherein the steam pressure cooking level is maintained by supplying the steam from a constant pressure source.

References Cited by the Examiner

UNITED STATES PATENTS

| 2,369,932 | 2/1945 | Allen | 99—332 X |
| 2,557,613 | 6/1951 | Palensky | 99—410 |
| 2,967,773 | 1/1961 | Anderson | 99—107 |
| 3,071,063 | 1/1963 | Churley | 99—332 |
| 3,071,473 | 1/1963 | Churley | 99—100 |

A. LOUIS MONACELL, *Primary Examiner.*

HYMAN LORD, *Examiner.*